United States Patent

[11] 3,620,316

[72] Inventors Nelson R. Henry;
Donald R. Middour, both of Decatur, Ga.
[21] Appl. No. 048,339
[22] Filed June 22, 1970
[45] Patented Nov. 16, 1971
[73] Assignee The Woodman Company, Inc.
Decatur, Ga.

[54] HIGH-SPEED CLASSIFICATION AND CHECKWEIGHING SYSTEM
21 Claims, 1 Drawing Fig.

[52] U.S. Cl. .................................................. 177/50,
177/52, 209/121
[51] Int. Cl. ...................................................... G01g 19/52
[50] Field of Search ........................................ 177/50, 52,
60; 209/121

[56] References Cited
UNITED STATES PATENTS

| | | | |
|---|---|---|---|
| 2,688,458 | 9/1954 | Schieser et al. | 177/50 |
| 2,818,888 | 1/1958 | Atwood et al. | 177/52 X |
| 3,225,847 | 12/1965 | Vergobbi et al. | 177/52 |
| 3,434,595 | 3/1969 | Seaborn et al. | 177/52 X |
| 3,484,813 | 12/1969 | Davies | 177/50 |

*Primary Examiner*—Richard B. Wilkinson
*Assistant Examiner*—George H. Miller, Jr.
*Attorney*—Lowe and King ABSTRACT: A system for monitoring packages and maintaining constant weight is disclosed wherein the checkweighing scale services at least two weighing scales with a scale selector switch responsive to the packaging means and independent of the package being checkweighed. The scale selector switch operates in synchronism with the scale dump timing switch also responsive to said packaging means to maintain the operations in step and adjustment means is provided to vary the number of bags between the packaging means and the checkweighing scale. A drive circuit includes check switch means responsive to the packaging means and independent of the package to energize companion reject-accept or classification and correction circuits to maintain the actions concurrent; a scale return circuit is provided; and a photoelectric sensing circuit is provided in said correction circuit to disable the same on a dry cycle. Holding relays maintain the companion circuits energized and delay means is provided in the drive circuit for the adjusting means of the scale being standardized to prevent switching of the classification, correction and scale return action during a single packaging cycle.

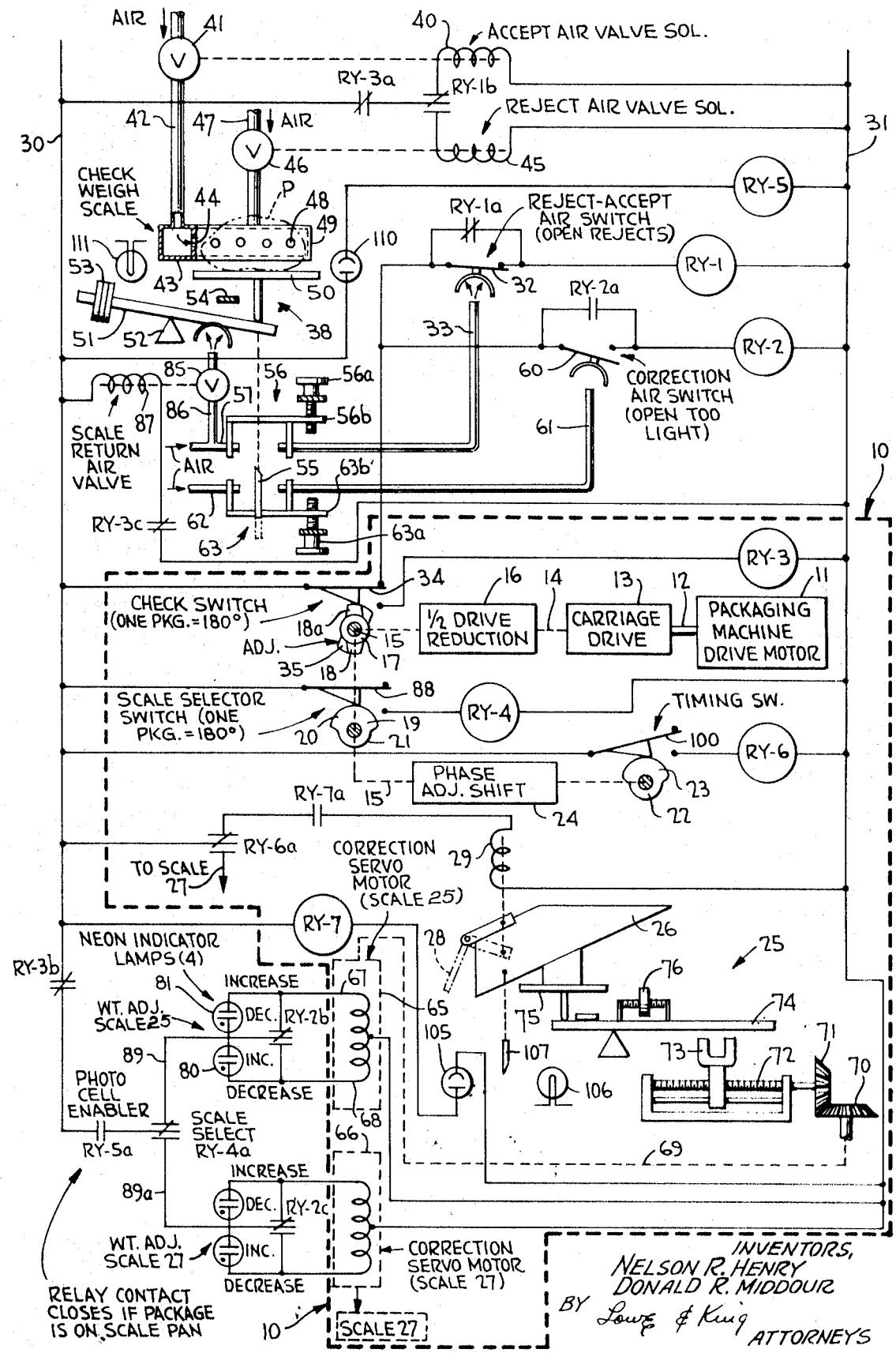

HIGH-SPEED CLASSIFICATION AND CHECKWEIGHING SYSTEM

The present invention relates to weighing systems, and more particularly, to a checkweighing system having classification and correction circuits for adjusting the weighing scales of a packaging machine or machines.

BACKGROUND OF THE INVENTION

In packaging machines for filling packages or containers with a predetermined weight of material, there exists a problem of maintaining the package-filling means in adjustment to dispense accurate weight charges over an extended period. Various factors affect the accuracy of the package-filling means, such as the changes in the physical properties of the material being packaged, the atmospheric conditions and the build up of residue in the packaging machine, particularly the weighing hopper. Various checkweighing systems have been devised wherein the finished packages from the packaging machine are received in sequence at a checkweighing station and monitored. In response to the deviation from set standards, the package may be classified, that is either accepted or rejected, and a correction signal is fed back to the weighing scale in the packaging machine to adjust the weight setting in accordance with the deviation.

Since the filling operation of a packaging cycle is the limiting factor insofar as speed of the packaging machine is concerned, there are proposals to provide multiple filling stations in a packaging machine in order to fill a plurality of packages at a time or in succession. Likewise in order to improve the efficiency of a packaging operation, it is proposed to feed the output from multiple machines to a single conveyor for checkweighing and packaging into multiple package cartons. However, with the introduction of such multiple sources of package filling an obvious new problem is introduced; that of identifying the particular filling mechanism which has produced a package being checkweighed at any given time.

The first solution suggested to one skilled in the art and one way in which the problem has been attached heretofore, is to provide photoelectric circuits or similar detectors to sense the presence of each filled bag and distribute the correction signal back to the filling means in accordance with the packages actually counted and checkweighed. While such prior art systems are acceptable under ideal conditions, the occurrence of a dry cycle, that is where a package is not formed at one scheduled interval, or the introduction or removal of packages to the system by operating personnel, causes the checkweighing system to get "out of step" with the packaging machine whereby faulty signals are fed back to the filling devices or scales. Without some correction, the faulty signals eventually cause a complete disruption of the filling cycles since each erroneous signal fed back tends to compound itself until the adjustments are set at the lowest or highest point thereby continuously producing grossly underweight or overweight packages.

Several schemes have been devised to attempt to overcome the identification problem. In the U.S. Pat. to Davies No. 3,484,813, issued Dec. 16, 1969, is disclosed one such method wherein a complex spacing arrangement between groups of packages is adopted and memory circuits are provided so that at the end of each group a reset is made thereby limiting any such identification error to only those packages in the group. While such a system thus approaches solution of the problem, a simpler and more efficient system wherein even an error in a group of packages does not have to be accepted, is clearly needed to advance the art of high-speed checkweighing whereby multiple filling devices may be put to greater use.

Another system is shown in the U.S. Pat. to Cunningham No. 3,115,165 wherein an extensive computer-type circuit is set up to control the checkweighing system and parts of the packaging machine. In this system, such critical functions of the packaging machine as forming the bag, setting the contents and code dating are operated separately so that again only under ideal conditions is the system capable of preventing "out-of-step" operation. This prior art system besides being very expensive is not adapted to incorporation into existing machines having no adaptation for computer control. In system where use is made, the speed of the computer must be constantly adjusted to attempt to match the speed of the packaging machine, particularly after change of the machine to run a different size bag or package.

Furthermore, there is need for improvement in the simplification and performance of systems wherein reject-accept or classification circuit is combined with the correction circuit. Such companion circuits should be designed for concurrent and compact operation in the packaging cycle, but with the elimination of switching once a reading from the checkweighing scale is provided during any one packaging cycle.

OBJECTIVES OF THE INVENTION

Accordingly, it is one object of the present invention to provide a checkweighing system that overcomes the above-mentioned problems.

Another object of the present invention is to provide a checkweighing system responsive to the packaging means itself operative to accurately identify packages from a plurality of sources and to feed back correcting signals to automatically reset the weight setting of the device that filled the package being checkweighed.

It is another object of the present invention to provide a system having companion reject-accept and correction circuits capable of high-speed operation without midcycle switching.

It is still another object of the present invention to provide a checkweighing system having a first and second sensor to control the respective reject-accept and correction functions and a check switch to control the energizing of the circuits having said sensors.

BRIEF DESCRIPTION OF THE INVENTION

Thus, in accordance with the present invention a high-speed checkweighing system is provided wherein an independently operating packaging machine controls the entire operation of the checkweighing system. This system performs a checkweighing operation only in response to the formation of a package by the packaging machine and is insensitive to inserting or removing bags from the checkweighing system. A scale selector switch is provided which operates in synchronism with the scale dump timing switch and both of which are continuously rotated at the selected speed in response to the packaging machine rather than an outside source as in the prior art. Thus, any speed of the machine to form a particular size bag or in order to obtain the maximum efficiency of the machine may be selected without regard to the effect of the checkweighing system which automatically remains in step under all conditions.

In order to adapt the checkweighing system to any number of packages between the packaging machine and the checkweighing means, there is provided a phase adjustment means in the operating means for the selector switch and the timing switch of the packaging machine. As an example of one case where there are two filling means employed in a single packing means, the number of packages between the packaging means and the checkweighing means may be even, i.e., zero, two, four, etc.; thus, the filling of a package by the first filling means is accomplished in point of time by checkweighing of a package filled by the second filling means and the appropriate correcting of the same. In this situation, the checkweighing means can then be used with or without an intermediate conveyor without adjustment as long as the conveyor spaces remain an even number. The scale selector switch and the timing switch are 180 degrees out of phase for proper operation in this instance. When an odd number of intermediate packages are preferred, the same filling means is operating as is being corrected and the switches are in phase.

Further, in accordance with the present invention, check switch means responsive to said packaging means and independent of said packages is utilized in a drive circuit to energize the companion classification and correction circuits to maintain maximum efficiency of operating time and in-step operation with the packaging means. The relay in said drive circuit is selected to have a dropout time characteristic sufficiently slower than the pickup time characteristic of the relays employed in the classification and correction circuits whereby the operation and setting of the classification and checkweighing circuits is assured prior to being energized by the drive circuit to classify the packages and to drive the reversible servomotor.

A photoelectric sensing circuit is provided at the scale pan of the checkweighing scale to disable the correction circuit in the event of a dry cycle occuring. This prevents a false correction signal being sent to the reversible servomotor for the selected scale, but at the same time allows operation of the classification circuit to generate an airblast across the scale pan to clear the same for the next cycle.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments and its several details are capable of modification in various obvious respects, all without departing from the invention. Accordingly, the drawing and description are to be regarded as illustrative in nature, and not as restrictive.

BRIEF DESCRIPTION OF THE DRAWING

FIG. 1 is a schematic diagram of the checkweighing system constructed in accordance with the present invention.

DETAILED DESCRIPTION OF THE INVENTION

With reference now to the single figure of the drawing, there is shown a diagram in schematic form of a checkweighing system utilizing the principles of the present invention. An independently operating packaging machine is shown within a broken line outline, generally designated by the reference numeral 10, which packaging machine 10 may be a form and fill type wherein a continuous web of sheet material is formed into a tube and a sealing carriage is used to bring sealing jaws together to form transverse seals at the top and bottom of the bag. However, other types of packaging machines may be utilized in accordance with the principles set forth in this application and in accordance with the inventive principle of operating and the checkweighing system in response to the packaging machine or means.

The particular packaging machine 10 illustrated includes a drive motor 11 which operates continuously and is or may be regulated by a speed control device (not shown). Output shaft 12 serves to continuously drive carriage drive 13 which operates the transverse sealing jaws (not shown) to form the discrete packages. A drive shaft 14 serves to drive an operating shaft 15 for the checkweighing system of the present invention through a one-half speed drive reducer 16. The operating shaft 15 has mounted thereon for driving in synchronism, a check cam 17 having two lobes 18, 18a spaced 180 degrees apart, a scale selector cam 19 having a 180 degree raised portion 20 and a 180 degree detent portion 21, and a scale dump timing switch 22 having a single raised lobe 23 thereon. A suitable adjustable connection 24 is provided on the shaft 15 to adjust the phase of the selector cam 19 and the timing cam 22 so that the number of packages between the packaging machine 10 and the checkweighing station may be varied, as will later be described.

As noted above, the preferred embodiment of the checkweighing system of the present invention is for controlling a packaging machine 10 having multiple filling stations. As is known in the art, these filling stations may be in the form of time-controlled dispensers, usually used with liquid products, or weighing scales, usually used with solid products. In the present disclosure for illustrative purposes, a beam-type weighing scale 25 has been illustrated with a hopper 26 mounted thereon for holding the charges of material to be packaged. It will be understood that another scale 27 identical to the scale 25 is present on the other filling side of the packaging machine 10; however, this need be illustrated only in dotted-line outline, it being understood that the operation is the same as that to be described with respect to the scale 25. The weighing hopper 26 has a pivotal gate 28, which, when operated by solenoid 29 (dotted line position), allows the charge of material to be dispensed into the package then being formed.

In accordance with the present invention, the packaging machine 10 utilizes a number of circuits controlled by the cams 17, 19, 22 in a unique manner to checkweigh the packages being formed without the possibility of getting out of step with said packaging machine 10 regardless of the speed of the machine, the number of dry cycles, packages being inserted or withdrawn from the system or other contingencies. A pair of input lines 30, 31 is provided to connect the system to a suitable potential source (not shown) and a classification circuit to perform the reject-accept function is shown at the top of the diagram of the drawing. The reject-accept or classification circuit includes a relay RY-1 in series with an air switch 32 which is normally open and operated or closed by an airblast from the air tube 33. The relay RY-1 has contacts RY-1a in parallel across the switch 32 to hold the circuit in once the relay RY-1 has been actuated. A check switch 34 is also provided in the classification circuit and is raised to complete said circuit once during each package-making cycle of the packaging machine 10 by the lobes 18, 18a of cam 17.

Once the switch 34 is brought into contact as shown in the diagram, the circuit remains closed until the cam 17 releases the same. This means that the time during which the relay RY-1 is energized is controlled by the effective length of the lobes 18, 18a. As will be seen later, these lobes also advantageously control the amount of correction fed to weighing scales 25, 27 in the same manner. In order to vary the size of the lobes, suitable adjustable extensions 35 may be provided. In this way, the desired degree of classification or correction action may be made, such as may be required for any particular ambient condition, type of material being packaged or other condition.

The relay RY-1 has contacts RY-1b that perform the classification of package P situated at checkweighing scale 38. These contacts are normally in position to complete the circuit through an accept air valve solenoid 40. Thus, once an airblast has closed the air switch 32 and check switch 34 has operated to bring in the circuit, the solenoid 40 operates air valve 41 in air supply line 42 which serves to pressurize the air manifold 43 having openings 44 through which the airblast, timed by the cam 17, is released. This action blows the package P to the right as viewed in FIG. 1, and into the "accept" receiving station.

A reject air valve solenoid 45 operates air valve 46 along supply line 47 in the situation where the switch 32 has not operated, such as in the instance where the package P is absent. In this situation, an air blast is provided through the openings 48 from a manifold 49 at a 90 degree angle to the manifold 43 and therefore capable of clearing the area and conveying a lightweight package in a separate "reject" depositing position.

The package P, when positioned for "reject" or "accept" as just described, has come to rest on scale pan 50 of the checkweighing scale 38 either directly from the packaging machine 10 or from a suitable in-step transfer conveyor. The scale 38 is of the high-speed type so as to reach a stable condition rapidly after the package P has been positioned thereon. Broadly, the scale 38 thus includes beam 51, fulcrum support 52, counterweight 53 and return stop 54. Connected to the beam 51 for movement with the scale pan 50 is an inverted knife edge flag 55 which forms an integral part of a first air sensor, generally designated by the reference numeral 56. The sensor 56 includes an air source tube 57 having an exit orifice directed across a gap toward and in alignment with the mouth of operating tube 33 for the switch 32.

Thus, to review the operation so far, with a package P on the scale pan 50, the flag 55 is moved downwardly to open the gap of the sensor 56, allowing pressurized air to enter the tube 33 and move the switch 32 to the closed position, as shown. The relay RY-1 is immediately energized and held by contacts RY-1a and closes the contacts RY-1b, operates the air valve 41 to blow the bag P off the scale pan 50 into the "accept" receiving station. If the flag 55 had not moved out of the gap of the sensor 56 so that the switch 32 had not been closed, then the reject air valve 46 would have been operated since the contacts RY-1b would have been in the other position, and the lightweight bag would have been removed to the "reject" collection station. If the initial blast of the air from the manifolds 43, 49 should rapidly release the scale pan 50 so as to move the flag 55 up into blocking position across the sensor 56, the switch 32 would immediately open; however, because of the holding contacts RY-1a, the circuit remains in effect for the predetermined time; that is, until released by the check switch 34 dropping down from the lobe 18a of the cam 17.

The second circuit of major importance in accordance with the present invention, is the correction circuit utilized for adjusting the weight setting of the two scales 25, 27 of the packaging machine 10. The correction circuit includes a relay RY-2 which is energized by a second air switch 60 and which has holding contacts RY-2a to hold the circuit in once it has been made by movement of the check switch 34 to the closed position, as shown. The switch 60 is operated by an airblast from air tube 61; the air being transmitted from a suitable supply tube 62 across a gap-forming sensor 63 through which the flag 55 moves. In the position shown in the diagram, the package P is considered to be too light, and accordingly an increase in weight to the appropriate weighing hopper is called for and will be discussed presently. If the flag 55 had moved further down as so to clear the gap of the sensor 63 by virtue of a too heavy package P being present on the checkweigh scale, then it is clear that the switch 60 would have been closed, energizing the relay RY-2 and holding contacts RY-2a.

The position of the sensors 56, 63 may be adjusted relative to the flag 55 by thumbscrews 56a, 63a, respectively. The adjustment moves the respective carriages 56b, 63b whereby the position for opening the gap to actuate the switches 32, 60 may be adjusted. Thus, in effect the differential between the minimum bag weight, as determined by the sensor 56, and the theoretical perfect bag, as delineated between the two positions of the sensor 63, may be adjusted.

To transfer the signal of the condition of the sensor 63, the relay RY-2 has contacts RY-2b and RY-2c to operate the selected winding of servomotors 65, 66 for correcting the scales 25, 27, respectively. In the open position of RY-2, winding 67 for rotating the motor 65 (and motor 66, it is to be understood, includes a corresponding winding, and an opposite winding) is in circuit to cause an increase in the weight setting (adjust up) in the scale 25. It follows that, in the energized position, the contacts RY-2b close the winding 68 for decreasing the weight or load setting (adjust down) of the scale 25.

The increase and decrease is transferred through suitable drive shaft 69 having a pinion 70 and driven gear 71 meshed therewith. The gear 71 turns a positioning screw 72 that is operative to move a permanent magnet 73 in the longitudinal direction along scale beam 74 of the scale 25. The scale beam 74 is fabricated of iron or other ferrous metal so as to be attracted by the magnet 73. It will be realized that as the magnet 73 is moved along the scale beam 74, the amount of weight necessary to depress scale pan 75 supporting the hopper 26 is appropriately varied due to change in the effective lever arm. A conventional counterweight 76 may be provided to set the original adjustment of the scale beam 74 to match the desired predetermined weight of the charge being introduced into the hopper 26. The adjustment of the magnet 73, and thus the effective weight setting of the scale 25, is accompanied by lighting of neon indicator lamps 80, 81; the indicator lamp 80 being energized through the winding 68 when the winding 67 is being utilized to cause an increase correction, and the lamp 81 being energized through the winding 67 when the decrease winding 68 has been selected.

The drive circuit for controlling the important concurrent actuation of the classification and correction circuits just described includes the relay RY-3. The first set of contacts is RY-3a in the classification circuit, which contacts are normally closed. Therefore, the circuit is operative as described above as long as the check switch 34 maintains the position shown in the drawing. Likewise, contacts RY-3b in the correction circuit are normally closed so as to permit operation as described above.

Relay RY-3 also controls actuation of an air valve 85 for directing air from the supply tube 86 against the bottom of the scale beam 51 to return the scale pan 50 to the home position. This is accomplished through normally closed contacts RY-3c that operate the coil 87.

A novel aspect of the drive circuit is the inclusion of delay means to hold the relay RY-3 open until relays RY-1 and RY-2 have been actuated by a switching of the check switch 34 by the cam 17 from the drive circuit to the companion classification and correction circuits. Rather than providing a separate delay device in the circuit, preferably the relay RY-1 and relay RY-2 are selected so as to have a shorter pickup time characteristic than the dropout time characteristic of the relay RY-3. Typically, the relays RY-1, RY-2 may have a pickup time of approximately 35 milliseconds whereas the relay RY-3 may have a dropout time of 85 milliseconds. Thus, it will be seen even with the time required for the switch 35 to change contacts between the respective circuits working against this time spacing, the contacts RY-3a, RY-3b and RY-3c are held open an instant past the time when the relays RY-1 and RY-2 have been actuated. This means that the companion classification and correction circuits are set and held by the corresponding holding contacts RY-1a and RY-2a before the package P is blown from the checkweigh scale pan 50, before the correction motors 65, 66 are actuated and before the checkweigh scale 38 is returned by the airblast through the valve 85. Thus, no switching of the functions during midcycle to cause a faulty classification or faulty correction signal is possible.

In accordance with another important feature, the selection of the scale 25 or the scale 27 to be controlled by the correction circuit is determined in a novel manner by and in response to the packaging machine 10. Specifically, the cam 19 mounted on the operating shaft 15 opens selector switch 88 in response to the raised portion 20 and is closed by the detent portion 21; the latter position serving to actuate relay RY-4. Contacts RY-4a thus serve to select the first motor 65 to receive the correction during half the time and to select the second motor 66 for operation during the remaining half of the time. Thus, it will be noted that the correction signal from the correction circuit is fed to both the contacts RY-2b and RY-2c for the motors 65, 66 during each cycle, but only one of these contacts is operative, depending on which lead 89, 89a is selected by the contacts RY-4a to carry the actuating current from the lead 30. With this arrangement, the scale select signal may be a low voltage signal rather than sufficient to drive the motors 65, 66 which signal is easier to handle and transmit from the packaging machine 10.

Relay RY-6 is controlled by timing switch 100 operated by cam 22 also mounted for driving on the shaft 15. Contacts RY-6a are utilized to select the scale hopper that is, at any particular time, being used to fill a package. In the open position of the relay RY-6 illustrated, the hopper gate 28 associated with the scale 25 is thus being actuated by the operation of coil 29 and thus the hopper 26 of the first scale 25 is filling the package being formed. On the opposite side or detent portion of the cam 22, the timing switch 100 energizes the relay RY-6, switching the contacts RY-6a to enable the scale 27. It should be noted that with the arrangement shown in the diagram with the cams 20, 22 in step, an odd number of bags or packages, i.e., one, three, five, etc., is required between the packaging machine 10 and the scale pan 50 of the checkweighing scale 38. This is so, since if a bag is at present being filled by the hopper 26 associated with the first scale 25 and the correction motor 63 is at the same time being actuated to correct for a bag from the same scale, then a bag from the second scale 27 must have previously been made and now positioned therebetween.

If, on the other hand, it is desired to monitor bags directly from the packaging machine 10 or spaced at any other position along a conveyor with an even number of bags in between, the operator of the packaging machine 10 need only shift the phase of cams 20, 22 by 180 degrees by operation of the phase adjustment connection 24. Any suitable detachable connection that allows the adjustment of the cams 20, 22 with respect to each other, such as a set screw on either one of the cams 19, 22 is sufficient to meet the requirements of this means.

Cycle reset relay RY-7 is operated by a photocell 105 in response to interruption of the light beam from a lamp 106 by a flag 107 of the scale 25. This means that the hopper gate 28 is thus not opened (dotted line position) even though it has been enabled by shifting of timing switch 100 until the appropriate weight has been deposited in the scale hopper 26. Thus, it is possible for the cam 22 to switch the timing switch 100 for filling of a package at the second scale 27 without the gate 28 ever having been opened on that cycle which in turn means that a dry cycle and no bag is produced by the first scale 25. Advantageously this contingency does not adversely affect the maintenance of the in-step operation since the scale selector switch 88 has now also switched and the weight signal from the checkweighing scale 38 is thus properly fed to the scale 27 by contacts RY-4a. To prevent the dry cycle from causing a false correction reading to be sent to the appropriate scale since no package producing a "too light" signal will now appear at the checkweighing scale 38, a sensing circuit having relay RY-5 is provided to disable the correction circuit through contacts RY-5a. The relay RY-5 is energized in this circuit and contacts RY-5a closed by any suitable energy sensing means looking across the scale pan 50, such as photocell 110, operated through interruption of a light beam from lamp 111 only in the presence of a package P. Furthermore, if during the operation of the machine, on of the packages P is removed by the operator for inspection, the absence of said package P from the scale pan 50 does not affect the correction circuit and no faulty correction is made.

In view of the foregoing detailed description with reference to the drawing, it will be realized the checkweighing system of the present invention controlled by the operation of the packaging machine 10 offers real advantages in insuring continuous identification of the packages and correction of the proper weighing scale 25, 27. A classification circuit is actuated concurrently with the correction circuit and delay means is provided to insure energizing and setting of the circuits prior to energizing the drive circuit to perform the intended operations to prevent midcycle changes. The sensing circuit at the checkweighing scale insures that faulty corrections are not made as a result of dry cycles or a bag having been removed from the stream.

In this disclosure, there is shown and described only the preferred embodiment of the invention, but, as aforementioned, it is to be understood that the invention is capable of various changes or modifications within the scope of the inventive concept as expressed by the accompanying claims.

We claim:

1. A high-speed checkweighing system for monitoring packages from an independently operating packaging means and maintaining constant weight thereof comprising at least first and second filling means for dispensing predetermined charges of material to be packaged, means for adjusting the setting of each of said filling means to change the weight of said charge; means responsive to said packaging means operative during each packaging cycle to identify said first and second filling means used for filling each package being checkweighed, checkweighing means for weighing said packages and feedback correction means responsive to said checkweighing means and the identification means, whereby correction of the proper filling means by operating the corresponding adjusting means and synchronism with said packaging means is assured.

2. The system of claim 1 wherein each of said filling means comprises a scale and a hopper on said scale for weighing the charges of material.

3. The system of claim 1 wherein said identification means includes a selector switch responsive to said packaging means and means for operating said selector switch in response to each packaging cycle to connect said correction means to the adjusting means of said first and second filling means on successive packaging cycles.

4. The system of claim 3 wherein said selector switch is operated by a cam, substantially 180 degrees of said cam being a raised portion corresponding to said first filling means and 180 degrees being a detent portion corresponding to said second filling means, whereby two scales are controlled.

5. The system of claim 3 wherein said identification means further includes a timing switch responsive to said packaging means for filling said packages from said first and second filling means on successive packaging cycles, said operating means serving to operate said timing switch in synchronism with said selector switch.

6. The system of claim 5 wherein is provided a cycle reset relay responsive to said packaging means for each of said filling means responsive to the weight therein to disable the same for a dry cycle when the required weight is not made to minimize formation of underweight packages.

7. The system of claim 5 wherein is provided phase adjustment means in said operating means between said selector switch and said timing switch, whereby the number of packages between said packaging means and said checkweighing means may be varied.

8. The system of claim 5 wherein the number of filling means is limited to two and the number of packages between said packaging means and said checkweighing means is even whereby filling of a package by said first filling means is accompanied in point of time by checkweighing of a package filled by said second filling means and correcting of said second filling means.

9. The system of claim 5 wherein the number of filling means is limited to two and the number of packages between said packaging means and said checkweighing means is odd whereby filling of a package by said first filling means is accompanied in point of time by checkweighing of a package filled by said first filling means and correcting the same.

10. A high-speed checkweighing system for monitoring packages from packaging means and maintaining constant weight thereof comprising a filling means for dispensing predetermined charges of material to be packaged, means for adjusting the setting of said filling means to change the weight of said charge, checkweighing means including a scale pan for weighing at least some of said packages, a classification circuit having a first sensor on said checkweighing means, means to classify said packages in response to said classification circuit, said packages being rejected when below a predetermined minimum weight is sensed and accepted when above, a correction circuit including a second sensor on said checkweighing means for determining the weight variation of said packages, feedback correction means responsive to said correction circuit to operate said adjusting means to increase the setting of said filling means if a lightweight package is produced and to decrease the setting if a heavyweight package is produced and a check switch means responsive to said packaging means for energizing of said classification circuit and said correction circuit, whereby classification and checkweighing is concurrently performed for each of said packages.

11. The system of claim 10 wherein each of said filling means comprises a scale and a hopper on said scale for weighing the charges of material.

12. The combination of claim 10 wherein said sensors comprise pneumatic switches, means for projecting an airstream across a gap and flag means mounted on said scale to energize the respective circuit.

13. The combination of claim 10 wherein is further provided a holding relay in each of said circuits whereby once energized the circuits remain in the same state until released by said check switch means.

14. The combination of claim 10 wherein is provided delay means in said classification and correction circuits whereby switching of the classification and checkweighing actions during a single cycle is avoided.

15. The combination of claim 10 wherein said classification means includes first and second air manifolds positioned at 90 degrees with respect to each other adjacent said scale pan, discharge openings in said manifolds looking across said scale pan, and an air source for generating a blast of air from said openings to sweep said packages from said scale pan.

16. The combination of claim 10 wherein is further provided a sensing circuit including an energy-sensing means looking across the scale pan of said checkweighing means to detect the presence of a package, enabling switch means only in said correction circuit responsive to said energy-sensing means to enable operation of said correction circuit in the presence of a package but without effect on said reject-accept circuit so as to allow clearance of said scale pan during each cycle.

17. The combination of claim 10 wherein is further provided a second filling means for dispensing predetermined charges of material to be packaged, means for adjusting the setting of said second filling means to change the weight of said charge, means responsive to said packaging means to identify the filling means used for filling each package being checkweighed, said correction means being responsive to said checkweighing means and said identification means, whereby correction of the proper filling means by operating the corresponding adjusting means and synchronism with said packaging means is assured.

18. The combination of claim 10 wherein is further provided cam means responsive to said packaging means for controlling said check switch means for energizing said circuits, whereby the energizing of said correction and classification circuit is at a fixed time during each packaging cycle and for a fixed time period.

19. The combination of claim 18 wherein said cam means is adjustable to permit varying of the amount of correction and classification action during each packaging cycle.

20. The combination of claim 10 wherein is provided scale return means operative to return the scale pan to home position in response to the switching of said check switch means for energizing said classification and correction circuits.

21. The combination of claim 20 wherein said scale includes a pivotal beam, and said return means includes means for projecting a fluid stream against said beam.

* * * * *